United States Patent [19]

Ito

[11] Patent Number: 4,989,080
[45] Date of Patent: * Jan. 29, 1991

[54] COLOR CORRECTION DEVICE WITH A HUE AREA JUDGMENT UNIT TO DETERMINE CORRECTION PARAMETERS

[75] Inventor: Takanori Ito, Yokohama, Japan

[73] Assignee: Ricoh Company, Ltd., Tokyo, Japan

[*] Notice: The portion of the term of this patent subsequent to Jan. 29, 2008 has been disclaimed.

[21] Appl. No.: 319,722

[22] Filed: Mar. 7, 1989

[30] Foreign Application Priority Data

Mar. 8, 1988 [JP] Japan .................... 63-54188

[51] Int. Cl.⁵ ..................... H04N 1/46; G03F 3/08
[52] U.S. Cl. ........................... 358/80; 358/75
[58] Field of Search .............. 358/75, 80, 22, 28

[56] References Cited

U.S. PATENT DOCUMENTS

| 2,660,613 | 11/1953 | Young, Jr. ............... 358/29 C |
| 4,535,414 | 8/1985 | Shiota et al. .............. 358/80 |
| 4,643,563 | 2/1987 | Sayanagi ................. 358/80 |
| 4,670,780 | 6/1987 | McManus et al. ........... 358/80 |
| 4,675,704 | 6/1987 | Yamamoto ................ 358/80 |
| 4,737,842 | 4/1988 | Nagasaki ................. 358/28 |
| 4,763,186 | 8/1988 | Sarabia et al. ............. 358/80 |
| 4,782,384 | 11/1988 | Tucker et al. ............. 358/27 |

FOREIGN PATENT DOCUMENTS

| 0010251 | 1/1985 | Japan .................... 358/80 |
| 2208460 | 3/1989 | Japan . |
| 1-228268 | 9/1989 | Japan . |
| 1-255380 | 10/1989 | Japan . |
| 1-272266 | 10/1989 | Japan . |
| 1-27706 | 11/1989 | Japan . |

Primary Examiner—James J. Groody
Assistant Examiner—Kim Y. Vu
Attorney, Agent, or Firm—Oblon, Spivak, McClelland, Maier & Neustadt

[57] ABSTRACT

A color correction device used for a color electrophotographic machine or color printing machine. The device includes a hue area judgement unit for judging to which hue area among at least three predetermined hue areas the hut represented by input color image signals belongs by comparing the input color image signals with each other. With respect to the judged hue area according to this judgment, color correction parameters are set, and in accordance with the set color correction parameters, the input image signals are converted to output color image signals used for printing.

6 Claims, 4 Drawing Sheets

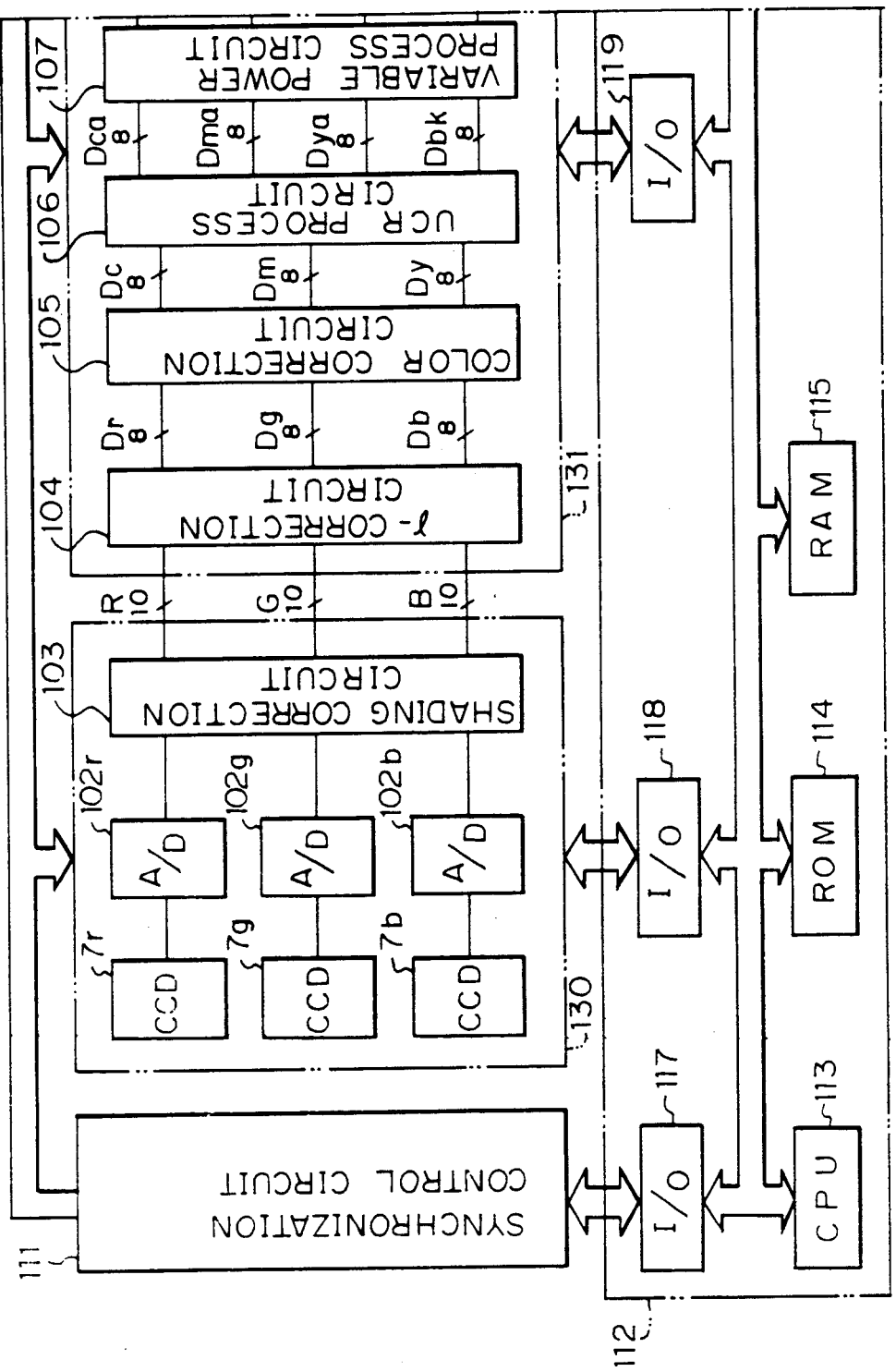

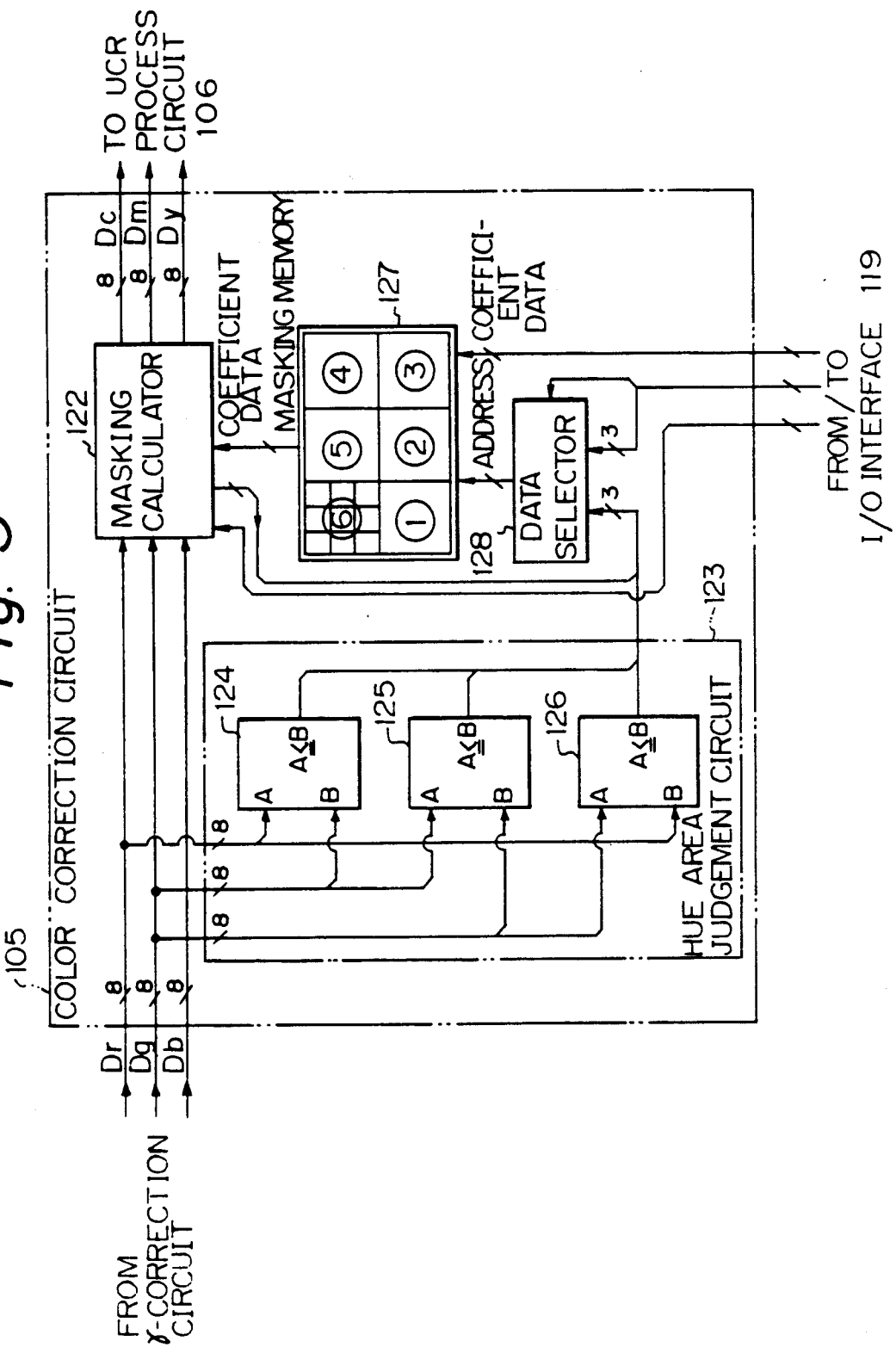

COLOR CORRECTION DEVICE WITH A HUE AREA JUDGMENT UNIT TO DETERMINE CORRECTION PARAMETERS

BACKGROUND OF THE INVENTION

1. Field of the Invention

The present invention relates to a color correction device which adjusts the color components of an image signal containing color information in a color image reproducing machines.

2. Description of the Related Art

In digital color image reproducing machines such as color copying machines, color facsimile devices or color video printers, an original color image is converted by a photoelectric conversion element to R (red) G (green) and B (blue) component density signals, which are then converted digitally to corresponding color image data components Dr, Dg and Db. These image data components Dr, Dg and Db are then converted to recorded density data components Dy, Dm and Dc of recorded colors Y (yellow), M (magenta) and C (cyan), and the respective recorded densities are determined on the basis of the Dy, Dm and Dc.

Theoretically, the original image and print images are the same in color. However, actually, if the R, G and B signals obtained from the original are solely converted to C, M and Y signals and printed in three color toners, a large difference will be produced between the original color and the printed color because (a) the spectral characteristic of color separation filters used in the image read unit are actually not ideal, (b) the color of each of the toners used for printing is also not ideal, and (c) the color obtained by the principle of subtractive color mixture for laying a plurality of print colors sequentially one on top of another is different from the actual printed color. In order to avoid such discrepancy, when the R, G and B signals are converted to the C, M and Y signals, a masking process is performed to correct the colors. However, an "additivity rule of densities" does not actually hold due to the influence of surface reflection, etc. As a result, correct color correction cannot be performed.

The masking techniques are known, for example, in (1) Japanese Laid-Open Publication No. 59-161981 (British Patent No. 2145598) and (2) Japanese Laid-Open Publication No. 62-47273. In the techniques of the reference (1), nine coefficients used in the masking process are separately adjustable in a plurality of stages. By changing those coefficients, the contents of the color correction by the masking process are changed and as a result the colors to be printed are adjustable. In this technique, however, since the respective masking coefficients do not correspond to the basic colors of Y, M and C in one-to-one relationship, it is not clear which coefficients should be adjusted in what manner in order to obtain a desired particular color. Therefore, adjustment is required to be repeated many times by trail and error. If the color tone of a particular color is preferentially changed, a balance among Y, M and C colors may be undesirably lost and achromatic color portions such as black and gray portions of the image may often be colored.

The techniques of the (2) reference are intended to correct the colors by referring to the contents of a memory table and changing a part or the whole of the memory table to adjust the colors. However, in the particular reference, it is necessary to prepare a memory having a large capacity corresponding to the degree of freedom of color adjustment. In that case, therefore, if the degree of freedom of color adjustment is heightened, the device would undesirably become expensive.

In these types of devices, the user must adjust colors as needed in addition to the basic color correction because of the aging of the color characteristic of the device itself, variations in the characteristic of the individual devices, the user's own taste in colors, and intentional requirement for color change, etc.

In order to facilitate the user's adjustment, the inventor proposed a color copying machine in which the user inputs data on a color to be changed and information on the resulting color to a color correction device which sets a color correction parameter on the basis of these inputs, as disclosed in U.S. Ser. No. 260,277 filed Oct. 20, 1988. In this color copy machine, a hue is divided into a plurality of areas, each having an allocated color correction parameter, which is adjusted so that the color of only a desired hue area is adjusted, and thus recorded color adjustment does not act on a hue area deviating greatly from the desired hue area and hence recorded color adjustment is easy and performed with high reliability.

The hue area judgement circuit disclosed by the aforementioned application has a complicated structure and it is difficult to simplify the structure of the hardware and processing logic to make the whole device more inexpensive.

SUMMARY OF THE INVENTION

It is therefore an object of the present invention to provide a color correction apparatus which is capable of easily judging a hue area and has a simplified circuit configuration.

It is another object of the present invention to provide a color correction apparatus in which an erroneous judgement as to a hue area is unlikely to occur.

In order to achieve the above objects, the present invention provides a color correction device which corrects input image signals of basic colors, representative of color-separated input images, to produce output image signals of other basic colors, representative of output images for printing. The device comprises a hue area judgement unit for judging to which hue area among at least three predetermined hue areas the hue represented by the input image signals belongs, by comparing the input image signals with each other; a parameter setting unit for setting color correction parameters with respect to the hue area judged by the hue area judgement unit; and a color conversion unit for converting the input image signals to the output image signals in accordance with the set color correction parameters.

It is preferred that the hue area judgement unit includes a plurality of comparators for comparing the input image signals with each other.

The above comparators may be three comparators for judging to which hue area among six predetermined hue areas the hue represented by the input image signals belongs, by comparing the input image signals with each other.

Preferably, the parameter setting unit comprises a parameter hold unit for holding color correction parameters the number of which is equal to or greater than the number of the predetermined hue areas, and a selection unit for selecting a part of the color correction parameters held in the parameter hold unit in accordance with the hue area judged by the hue area judgement unit.

The parameter setting unit may be a parameter setting unit for correcting at least one part of the spectral density value related to printing color for a particular color corresponding to the boundary between the hue areas and of the amount of toners used for printing the particular color, on the basis of a predetermined stoichiometric value and the input information signals, and for calculating the color correction parameters on the basis of the corrected spectral density value and/or amount of toners.

The present invention also provides a color correction device which corrects input image signals Dr, Dg, and Db of basic colors of red, green, and blue, representative of color-separated input images, to produce output image signals of another basic colors, representative of output images for printing. This device comprises a hue area judgement unit for judging to which hue area among at least three predetermined hue areas the hue represented by the input image signals belongs, by comparing the input image signals Dr, Dg, and Db with each other; parameter hold unit for holding color correction parameters xr, xg, and xb for the respective hue areas, each of the parameter hold unit for the each hue area holding a plurality of the color correction parameters; parameter selection unit for selecting one set of color correction parameters xr, xg, and xb from color correction parameters in the parameter hold unit in accordance with the hue area judged by the hue area judgement unit; and a color conversion unit for converting the input image signals Dr, Dg, and Db, by using the selected color correction parameters xr, xg, and xb, to the output image signals which represent the result of calculation of xr·Dr+xg·Dg+xb·Db.

Other objects and features of the present invention will now be apparent from the following description on an embodiment of the present invention in conjunction with the drawings.

BRIEF DESCRIPTION OF THE DRAWINGS

FIG. 3 is a block diagram of a color correction circuit of FIG. 2.

DETAILED DESCRIPTION OF THE PREFERRED EMBODIMENT

The principles of the present invention will now be described before the description of an embodiment of the present invention.

Where input image signals Dr, Dg and Db indicate the corresponding R, G and B color component densities of the original image, and their spectral density ratios dr, dg and db are defined as follows:

$$dr = Dr/(Dr+Dg+Db)$$

$$dg = Dg/(Dr+Dg+Db) \quad (1)$$

$$db = Db/(Dr+Dg+Db)$$

Figure 1:
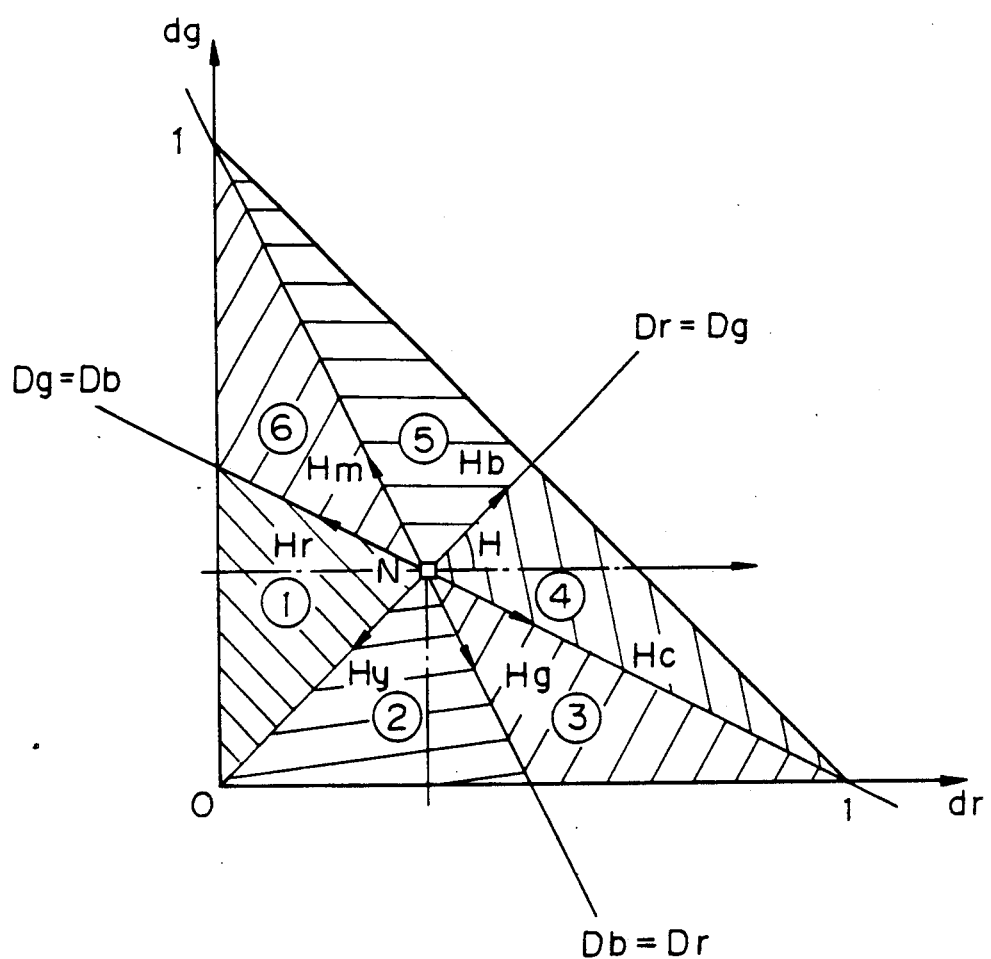
FIG. 1 illustrates an example of divisions of a hue area in the present invention.

If a hue is defined by an angle H on a chromaticity diagram shown in FIG. 1 with dr and dg axes, with the position of an achromatic color N (Dr=Dg=Db) as the center and with the dr axis as a reference, areas where hue area judgement (in other words density ratio area judgement) is easy by comparison of Dr, Dg and Db one with the other are the six areas ① to ⑥ divided by the following six boundary lines Hy, Hb, Hm, Hg, Hc and Hr represented by an equation (2) and having the position of N as the starting point:

$$Hy: Dr=Dg \leq Db$$

$$Hb: Dr=Dg \geq Db$$

$$Hm: Db=Dr \leq Dg \quad (2)$$

$$Hg: Db=Dr \geq Dg$$

$$Hc: Dg=Db \leq Dr$$

$$Hr: Dg=Db \geq Dr$$

If the whole of the areas ① to ⑥ is bisected by some boundary line, the divided area segments would be coarse, so that the whole is divided into three or more area segments, for example, into three equal areas segments by three boundary lines. In the following description, a hue is divided into six areas ① to ⑥. In the chromaticity diagram of FIG. 1, the boundary lines Hy and Hb are on the straight line Dr=Dg, Hr and Hc on the straight line Dg=Db, and Hg and Hm on the straight line Db=Dr. Therefore, If Dr, Dg and Db are in the hue area ① between the hues Hr and Hy, Dr≦Dg≦Db, If Dr, Dg and Db are in the hue area ② between the hues Hy and Hg, Dg≦Dr≦Db, If Dr, Dg and Db are in the hue area ③ between the hues Hg and Hc, Dg≦Db≦Dr, If Dr, Dg and Db are in the hue area ④ between the hues Hc and Hb, Db≦Dg≦Dr, If Dr, Dg and Db are in the hue area ⑤ between the hues Hb and Hm, Db≦Dr≦Dg, and If Dr, Dg and Db are in the hue area ⑥ between the hues Hm and Hr, Dr≦Db≦Dg.

Therefore, the areas are judged as follows:
(a) If Dr≦Dg≦Db, the hue area is in the area ①,
(b) If Dg≦Dr≦Db, the hue area is in the area ②,
(c) If Dg≦Db≦Dr, the hue area is in the area ③,
(d) If Db≦Dg≦Dr, the hue area is in the area ④,
(e) If Db≦Dr≦Dg, the hue area is in the area ⑤, and
(f) If Dr≦Db≦Dg, the hue area is in the area ⑥.

The comparison of the input image signals Dr, Dg and Db, one with the other, is possible with the use of three comparators, so that the hardware and processing logic used for the area detection are simplified and the cost of the color correction apparatus is reduced. In addition, no wrong recognition occurs advantageously.

Masking coefficients (color correction parameters) for the respective areas will be described. In the present invention an input image signal is divided into a plurality of areas in accordance with hues, and masking coefficients each are determined for a respective area. In that case it is necessary to beforehand determine boundary colors for the corresponding hue areas (chromatic colors: Dr≠Dg, Dg≠Db or Db≠Dr) in order to calculate the respective hue area masking coefficients from the spectral densities of a total of three colors, i.e., two colors representing the boundaries of the respective areas and an achromatic color other than white.

Where P and Q represents the boundary of an area and N represents an achromatic color other than white, mixed color equations for the respective colors (P, Q, N) are given by the following equations (3) to (5):

$$\begin{pmatrix} DPr \\ DPg \\ DPb \end{pmatrix} = \begin{pmatrix} DCr' & DMr' & DYr' \\ DCg' & DMg' & DYg' \\ DCb' & DMb' & DYb' \end{pmatrix} \times \begin{pmatrix} DPc/DCr \\ DPm/DMg \\ DPy/DYb \end{pmatrix} \quad (3)$$

$$\begin{pmatrix} DQr \\ DQg \\ DQb \end{pmatrix} = \begin{pmatrix} DCr' & DMr' & DYr' \\ DCg' & DMg' & DYg' \\ DCb' & DMb' & DYb' \end{pmatrix} \times \begin{pmatrix} DQc/DCr \\ DQm/DMg \\ DQy/DYb \end{pmatrix} \quad (4)$$

$$\begin{pmatrix} DNr \\ DNg \\ DNb \end{pmatrix} = \begin{pmatrix} DCr' & DMr' & DYr' \\ DCg' & DMg' & DYg' \\ DCb' & DMb' & DYb' \end{pmatrix} \times \begin{pmatrix} DNc/DCr \\ DNm/DMg \\ DNy/DYb \end{pmatrix} \quad (5)$$

where (DPr, DPg, DPb), (DQr, DQg, DQb), (DNr, DNg, DNb) represent the spectral densities of the chromatic colors P, Q and the achromatic color N, respectively; DCr, DMg and DYb represent red, green and blue components of the spectral densities when cyan, magenta and yellow toners are recorded solid, and (DCr', DCg', DCb'), (DMr', DMg', DMb'), (DYr', DYg', DYb') represent the spectral densities of primary colors used for determination of the marking coefficients in this area, and (DPc, DPm, DPy), (DQc, DQm, DQy), (DNc, DNm, DNy) represent the recorded single-color densities of cyan, magenta and yellow to record the chromatic colors P and Q and the achromatic color N, respectively.

The equations (3) to (5) can be regarded as 9-elemented simultaneous linear equation on primary color spectral densities used for determination of the masking coefficients in this area, so that by solving these equations, the primary color spectral densities used for determination of the masking coefficients can be calculated.

$$\begin{pmatrix} DCr' & DMr' & DYr' \\ DCg' & DMg' & DYg' \\ DCb' & DMb' & DYb' \end{pmatrix} = \begin{pmatrix} DPr & DQr & DNr \\ DPg & DQg & DNg \\ DPb & DQb & DNb \end{pmatrix} \times \begin{pmatrix} DPc/DCr & DQc/DCr & DNc/DCr \\ DPm/DMg & DQm/DMg & DNm/DMg \\ DPy/DYb & DQy/DYb & DNy/DYb \end{pmatrix}^{-1} \quad (6)$$

Therefore, the masking coefficients are given by the following equation (7):

$$\begin{pmatrix} KCr & KCg & KCb \\ KMr & KMg & KMb \\ KYr & KYg & KYb \end{pmatrix} = \begin{pmatrix} DCr & 0 & 0 \\ 0 & DMg & 0 \\ 0 & 0 & DYb \end{pmatrix} \times \begin{pmatrix} DCr' & DMr' & DYr' \\ DCg' & DMg' & DYg' \\ DCb' & DMb' & DYb' \end{pmatrix}^{-1} \quad (7)$$

Figure 2B:
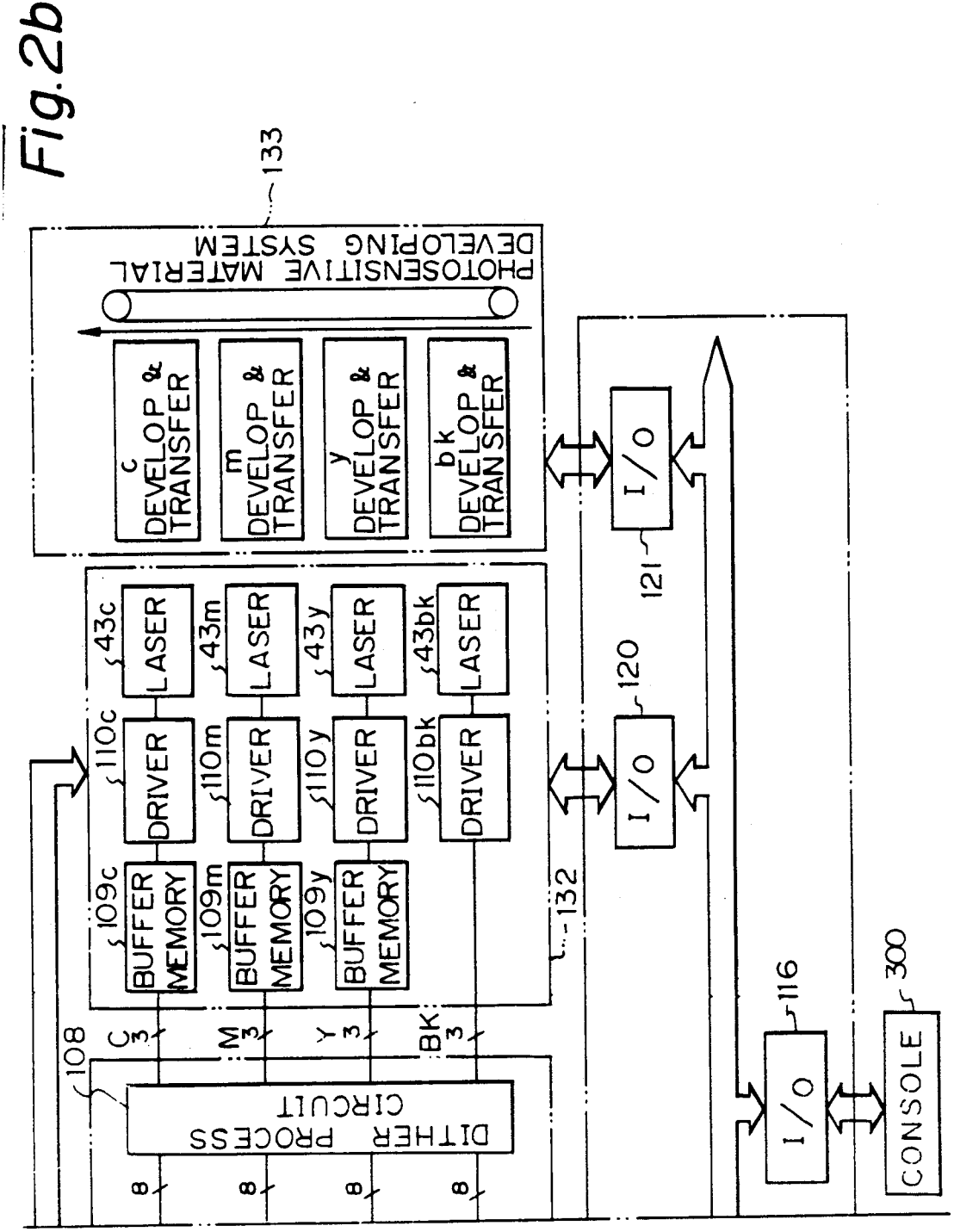
FIG. 2, constituted by FIG. 2a and 2b, is a schematic block diagram of a control unit of a digital color copying machine as an embodiment of the present invention.

A preferred embodiment of the present invention will now be described. FIG. 2 is a block diagram of a control unit of a digital copying machine. The reflection from an original document (not shown) is divided into R, G and B light components, which are then entered into solid state image pickup elements such as CCDs 7r, 7g and 7b, respectively. The analog outputs from CCDs 7r, 7g and 7b are converted by A/D converters 102r, 102g and 102b to digital signals, which are then input to a shading correction circuit 103. The correction circuit 3 corrects the color gradation data components as the digital output signals from the A/D converters for uneven optical illuminations and uneven sensitivities of the internal unit elements of the CCDs to thereby form read color gradation data components.

A γ-correction circuit 104 converts the color gradation data components subjected to the shading correction to the corresponding spectral density data components and also changes the gradation of the data components in accordance with the adjustment designation input given by the operation of operation buttons (not shown) on a console 300.

A color correction circuit 105 converts the read color data to the density data components of the recorded colors C, M and Y in accordance with the characteristic of the spectral reflection wavelength of recorded image forming toners and corrects the resulting density data components. The correction circuit 105 changes the masking coefficients (color correction parameters) for the areas ① to ⑥ in accordance with the hue adjustment designation input from the console 300, judges which of the areas ① to ⑥ the input image signal belongs to, and performs the aforementioned conversion and correction on the basis of the masking coefficients allocated to the determined areas.

A UCR (Under Color Removal) process circuit 106 corrects the color balance in the superposition of the respective color toners.

A variable power process circuit 107 changes the magnification of the respective color signals in the scanning direction in accordance with a command from the console 300.

A dither process circuit 108 changes the respective recorded color density data components to recorded gradation data (one bit per pixel) indicative of the record/non-record distributions at predetermined small area units.

A photosensitive material developing system 133 uniformly charges the surface of a photosensitive drum (not shown), forms a latent image on the charged drum surface using a laser beam, develops the latent image with a toner, and transfers the image to recording paper. These recording units are disposed along the direction of movement of the recording paper. Namely, black (BK), yellow (Y), magenta (M) and cyan (C) recording units are disposed in this order from the upstream side of the recording paper. Lasers 43bk, 43y, 43m and 43c of a recording and scanning system 132 expose the photosensitive drum surfaces of the recording units while scanning the drum surface.

By the above arrangement of the recording units the laser 43bk first starts to expose the corresponding drum surface and the laser 43c last starts. The exposure starting times of the respective units are different, so that the recording and scanning system 132 has three buffer memories 109y, 109m and 109c to hold the recorded data output from the dither process circuit 108 for the respective starting time differences.

The console 300 includes input means for gradation adjustment and hue adjustment in addition to input and output elements of the copy machine. The input to the console 300 is read by a CPU 113 of a control system 112, which further includes a ROM 114, a RAM 115 and I/0 interfaces 116 to 121. The microprocessor 113 delivers timing data to a synchronization control circuit 111, which, in turn, delivers timing signals to the image processing systems 130 to 133. The CPU 113 delivers adjusted data and control signals to the image processing systems 130 to 133.

The structure and operation of the color correction circuit 105 as one embodiment of the present invention will be described with reference to FIG. 3 using FIG. 1 as required. In the particular embodiment, the color correction circuit 105 includes a hue area judgement circuit 123, a masking coefficient memory 127 and a masking calculator 122. The hue area judgement circuit 123 includes three comparators 124, 125 and 126 which generate the outputs shown in Table 1.

TABLE 1

| COMPARATORS | INPUTS | OUTPUTS | | | | | |
|---|---|---|---|---|---|---|---|
| 124 | Dr, Dg | H | L | L | L | H | H |
| 125 | Dg, Db | H | H | H | L | L | L |
| 126 | Db, Dr | L | L | H | H | H | L |
| AREA JUDGE-MENT(MEMORY READ AREA) | | | | | | | |

These area judgement outputs are delivered as data group address data via a data selector 128 to the masking memory 127.

If there is a copy start input to the console 300, the CPU 113 of the control system 112 calculates the masking coefficients (color correction parameters) for the areas ①  to ⑥ and writes them in the masking memory 127, as mentioned above.

The masking calculator 122 calculates recorded color density data Dc, Dm and Dy indicative of the respective recorded cyan, magenta and yellow toner densities on the basis of the read color density data Dr, Dg and Db as follows:

$$Dc = KCr \cdot Dr + KCg \cdot Dg + KCb \cdot Db$$

$$Dm = KMr \cdot Dr + KMg \cdot Dg + KMb \cdot Db \quad (8)$$

$$Dy = KYr \cdot Dr + KYg \cdot Dg + KYb \cdot Db$$

where KCr, KCg, KCb, KMr, KMg, KMb, KYr, KYg, KYb, denote masking coefficients (a total of six groups, one for each of the areas ① to ⑥. A group is designated in accordance with the area judgement outputs (Table 1) from the comparators 124 to 126 and the appropriate masking coefficients are read from the masking coefficient memory 127 and delivered to the calculator 122.

When the CPU 113 of the control system 112 receives a copy start command signal from the console 300, it calculates the respective masking coefficients for the areas ① to ⑥ in accordance with the equation (7) in correspondence to the input to the hue adjusting means from the console 300 and writes the results in the masking coefficient memory 127.

Thus when an input image signal arrives from the image reading system 130 (the original image starts to be read), the hue area judgement circuit 123 of the color correction circuit 105 detects which of the areas the respective input image signals Dr, Dg and Db belong to and delivers the data (Table 1) indicative of the detected areas to the masking coefficient memory 127. That data designates one of the data groups (① to ⑥), each including nine masking coefficients. Each data segment of the group is designated by the masking calculator 122 which calculates the recorded color density data Dc, Dm and Dy from the masking coefficient data read from the memory 127 in this way, and the input read color density data Dr, Dc and Db in accordance with the equation (8) and delivers the results to the UCR process circuit 106.

The data selector 128 selects an input address data line. When the CPU 113 writes into the memory 127 the masking coefficients that the microprocessor has calculated before copy start (in response to the copy start input), it gives a selection command signal to the data selector 128 to connect the address line of the control system 112 to the address input of the memory 127. When the image data is then processed, the CPU 113 also gives a selection command signal to the data selector 128 to connect the output of the hue area judgement circuit 123 as the group address data and the address data of the masking calculator 122 as the intra-group coefficient designation data to the address input of the memory 127.

Many widely different embodiments of the present invention may be constructed without departing from the spirit and scope of the present invention. It should be understood that the present invention is not limited to the specific embodiments described in this specification, except as defined in the appended claims.

What is claimed is:

1. A color correction device for correcting input image signals of basic colors, representative of color-separated input images, to produce output image signals of other basic colors, representative of output images for printing, said device comprising:

a hue area judgement means having a plurality of comparators for comparing the input image signals with each other so as to judge to which hue area among at least three predetermined hue areas the hue represented by said input image signals belongs;

a parameter setting means for setting color correction parameters in accordance with the hue area judged by said hue area judgement means; and a color conversion means for converting said input image signals to the output image signals by using said set color correction parameters, so that the input image signals are corrected in accordance with the hue area judged with respect to the same input image signals.

2. A device as claimed in claim 1, wherein said hue area judgement means includes three comparators for judging to which hue area among six predetermined hue areas the hue represented by said input image signals belongs, by comparing the input image signals with each other.

3. A device as claimed in claim 1, wherein said parameter setting means comprises a parameter hold means for holding color correction parameters the number of which is equal to or greater than the number of said predetermined hue areas, and a selection means for selecting a part of the color correction parameters held in said parameter hold means in accordance with the hue area judged by said hue area judgement means.

4. A device as claimed in claim 1, wherein said parameter setting means comprises a parameter setting means for correcting at least one part of the spectral density value related to printing color for a particular color corresponding to the boundary between the hue areas and of the amount of toners used for printing said particular color, on the basis of a predetermined stoichiometric value and the input information signals, and for calculating the color correction parameters on the basis of said corrected spectral density value and/or amount of toners.

5. A color correction device for correcting input image signals Dr, Dg, and Db of basic colors of red, green, and blue, representative of color-separated input images, to produce output image signals of other basic colors, representative of output images for printing, said device comprising:
 a hue area judgement means having a plurality of comparators for comparing the input image signals Dr, Dg, and Db with each other so as to judge to which hue area among at least three predetermined hue areas the hue represented by said input image signals belongs;
 parameter hold means for holding color correction parameters xr, xg, and xb for the respective hue areas, each of said parameter hold means for the each hue area holding a plurality of the color correction parameters;
 parameter selection means for selecting one set of color correction parameters xr, xg, and xb from color correction parameters in said parameter hold means in accordance with the hue area judged by said hue area judgement means; and
 a color conversion means for converting said input image signals Dr, Dg, and Db, by using said selected color correction parameters xr, xg, and xb, to the output image signals which represent the result of calculation of xr·Dr+xg·Dg+xb·Db, so that the input image signals are corrected in accordance with the hue area judged with respect to the same input image signals.

6. A device as claimed in claim 5, wherein said hue area judgement means includes three comparators for judging to which hue area among six predetermined hue areas the hue represented by said input image signals belongs, by comparing to input image signals with each other.

* * * * *